US008732307B1

(12) United States Patent
Zhu et al.

(10) Patent No.: US 8,732,307 B1
(45) Date of Patent: May 20, 2014

(54) PREDICTIVE CONTROL FOR RESOURCE ENTITLEMENT

(75) Inventors: Xiaoyun Zhu, Cupertino, CA (US); Wei Xu, Beijing (CN); Sharad Singhal, Belmont, CA (US); Zhikui Wang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2332 days.

(21) Appl. No.: 11/492,354

(22) Filed: Jul. 25, 2006

(51) Int. Cl.
*G06F 15/82* (2006.01)
*G06F 15/173* (2006.01)
*G06F 9/46* (2006.01)
*H04L 29/08* (2006.01)
*G06F 9/52* (2006.01)
*G06F 9/50* (2006.01)

(52) U.S. Cl.
CPC ............ *H04L 29/08144* (2013.01); *G06F 9/52* (2013.01); *G06F 9/5072* (2013.01); *G06F 9/5061* (2013.01)
USPC ............ 709/226; 709/223; 709/225; 718/104

(58) Field of Classification Search
USPC .......... 709/221–226, 235–237; 370/235–237; 718/104
See application file for complete search history.

(56) References Cited

U.S. PATENT DOCUMENTS 5,884,037 A * 3/1999 Aras et al. .................... 709/226
5,996,013 A * 11/1999 Delp et al. .................... 709/226
6,016,503 A * 1/2000 Overby et al. ................ 718/104
6,067,412 A * 5/2000 Blake et al. ................... 718/102
6,516,350 B1 * 2/2003 Lumelsky et al. ............ 709/226
7,191,329 B2 * 3/2007 Murphy ........................ 713/100
7,310,672 B2 * 12/2007 Rolia ............................ 709/226
7,315,903 B1 * 1/2008 Bowden ....................... 709/250
7,325,050 B2 * 1/2008 O'Connor et al. ............ 709/223
7,437,728 B2 * 10/2008 Stackhouse et al. .......... 718/104
7,797,705 B2 * 9/2010 Oka .............................. 718/104
7,941,427 B2 * 5/2011 Barsness et al. .............. 707/720
2002/0156891 A1 * 10/2002 Ulrich et al. ................. 709/225
2003/0046396 A1 * 3/2003 Richter et al. ................ 709/226
2003/0061260 A1 * 3/2003 Rajkumar ..................... 709/104
2005/0102398 A1 * 5/2005 Zhang et al. ................. 709/225
2005/0165925 A1 * 7/2005 Dan et al. ..................... 709/224
2005/0193115 A1 * 9/2005 Chellis et al. ................ 709/226
2006/0047808 A1 * 3/2006 Sharma et al. ............... 709/224
2006/0168166 A1 * 7/2006 Hardwick et al. ............ 709/221
2006/0277305 A1 * 12/2006 Bernardin et al. ............ 709/226
2007/0002897 A1 * 1/2007 Goshen et al. ............... 370/468
2007/0050776 A1 * 3/2007 Ferren et al. ................. 718/104
2007/0058662 A1 * 3/2007 Yoshikawa ................... 370/447
2007/0101000 A1 * 5/2007 Childress et al. ............. 709/226
2007/0233866 A1 * 10/2007 Appleby et al. .............. 709/226
2007/0240161 A1 * 10/2007 Prabhakar et al. ............ 718/104
2007/0250629 A1 * 10/2007 Blanding et al. ............. 709/226

(Continued)

OTHER PUBLICATIONS

X. Liu, X. Zhu, S. Singhal, M. Arlitt: "Adaptive Entitlement Control of Resource Containers on Shared Servers" IEEE 9th International Symposium on Integrated Network Management , May 2005.*

(Continued)

*Primary Examiner* — Catherine Thiaw

(57) ABSTRACT

A resource consumption of a resource compartment for a time interval is predicted. A resource entitlement for the resource compartment for the time interval is determined based on the predicted resource consumption.

15 Claims, 6 Drawing Sheets

(56) References Cited

U.S. PATENT DOCUMENTS

| | | | |
|---|---|---|---|
| 2008/0022283 A1* | 1/2008 | Krieger et al. | 718/104 |
| 2008/0022284 A1* | 1/2008 | Cherkasova et al. | 718/104 |
| 2008/0052718 A1* | 2/2008 | Hundscheidt | 718/104 |
| 2008/0098400 A1* | 4/2008 | Golitschek Edler Von Elbwart et al. | 718/104 |
| 2008/0189418 A1* | 8/2008 | Kimbrel et al. | 709/226 |
| 2009/0300605 A1* | 12/2009 | Edwards et al. | 718/1 |
| 2010/0107172 A1* | 4/2010 | Calinescu et al. | 718/104 |

OTHER PUBLICATIONS

Raj Kumar, Vanish Talwar and Sujoy Basu: "A resource management framwork for interactive Grids", 2004, p. 489-501, article published in "Concurrency and Computation: Practice and Experience", Wiley and Sons.*

HP Openview Performance Agent, http://www.openview.hp.com/index.html, downloaded Jul. 21, 2006.

HP-UX Workload Manager, http://h20338.www2.hp.com/hpux11i/cache/328328-0-0-225-121.html?jumpid=reg_R1002_USEN, downloade Jul. 21, 2006.

Xen Virtual Machine, http://www.xensource.com/xen/about.html, downloaded Jul. 21, 2006.

Abdelzaher, T.F. et al., "Performance Guarantees for Web Server End-Systems: A Control-Theoretical Approach", downloade Jul. 21, 2006.

Chandra, A. et al., "Dynamic Resource Allocation for Shared Data Centers Using Online Measurements", downloaded Jul. 21, 2006.

Hellerstein, J. et al., "An Statistical Approach to Predictive Detection", Nov. 22, 1999.

Henriksson, D. et al, "Improved Prediction for Web Server Delay Control", downloaded Jul. 21, 2006.

Karlsson, M. et al., "Triage: Performance Isolation and Differentiation for Storage Systems", downloaded Jul. 21, 2006.

Lu, C. et al, "Feedback Utilization Control in Distributed Real-Time Systems with End-to-End Tasks", IEEE Transactions on Parallel and Distributed Systems, Jun. 2005.

Lu, Y. et al., "An Adaptive Control Framework for QoS Guarantees and its Application to Differentiated Caching Services", downloaded Jul. 21, 2006.

Lu, Y. et al., "Feedback Control with Queueing-Theoritic Prediction for Relative Delay Guarantees in Web Servers", downloaded Jul. 21, 2006.

Liu, X. et al., "Adaptive Entitlement Control of Resource Containers on Shared Servers", HPL--2004-178, Hewlett Packard Co, Oct. 14, 2004.

Mason, R.L. et al., "Statistical Design and Analysis of Experiments with Applications to Engineering and Science", Second Edition, Joh Wisely & Sons, 2003.

Mosberger, D. et al., "httperf-A Tool for Measuring Web Server Performance", downloaded Jul. 21, 2006.

Rolia, J. et al., "Statistical Service Assurances for Applications in Utility Grid Environments", HPL-2002-155, Hewlett Packard, Jun. 13, 2002.

Sha, L. et al., "Queueing Model Based Network Server Performance Control", Proc. of the 23rd IEEE Real-Time Systems Symposium, IEEE, 2002.

Shen, D. et al., "Predictive Models for Proactive Network Management: Application to a Production Web Server", downloaded Jul. 21, 2006.

Singhal, S., "Amplitude Optimization and Pitch Prediction in Multipulse Coders", IEEE Transactions on Acoustic, Speech and Signal Processing, Mar. 1989.

Vilalta, R. et al., "Predictive Algorithms in the Management of Computer Systems", IBM Systems Journal, vol. 14, No. 3, 2002.

Wang, Z. et al., "Utilization vs. SLO-Based Control for Dynamic Sizing of Resource Partitions", HPL-2005-126, Hewlett Packard, Jan. 23, 2006.

Xu, W. et al., "Predictive Control for Dynamic Resource Allocation in Enterprise Data Centers", HPL-2005-194, Hewlett Packard, Jan. 23, 2006.

HP Process Resource Manager, http://h20338.www2.hp.com/hpux11i/cache/317534-0-0-225-121.html?jumpid=reg_R1002_USEN, downloaded Jul. 21, 2006.

* cited by examiner

PREDICTIVE CONTROL FOR RESOURCE ENTITLEMENT

BACKGROUND

In many of today's data centers, servers are shared across multiple applications. However, current tools for allocating servers or server partitions to applications typically rely on offline capacity planning and performing a static partitioning of system resources to support these co-hosted applications. For example, each application is allocated a maximum entitlement of system resources for execution over the application's lifetime. Many times, the amount of the maximum entitlement of system resources is either based on anticipated peak load or demand profiles computed from historic data and performance models. However, the entitlement of system resources is static. For example, the entitlement of system resources is determined and used for a long period of time before being re-evaluated. This static entitlement typically results in poor utilization of system resources, which in many instances is below 20%, and does not take full advantage of demands that vary over time due to changes in operating conditions and user demands. In addition, this static entitlement cannot respond to unexpected spikes in demands therefore resulting in performance degradation or violation of service level objectives of the hosted applications.

BRIEF DESCRIPTION OF THE DRAWINGS

The utility, objects, features and advantages of the embodiments will be readily appreciated and understood from consideration of the following detailed description of the embodiments, when taken with the accompanying drawings, in which same numbered elements are identical and.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

According to an embodiment, a predictive control system in a resource-on-demand system is used to determine resource entitlement. The predictive control is a proactive approach as opposed to a reactive, feedback-driven approach in a classical control system. The predictive control may be used to improve utilization of resources in a resource-on-demand system, allow hosted-applications to meet their service level objectives (SLOs), or to achieve other system objectives.

Figure 1:
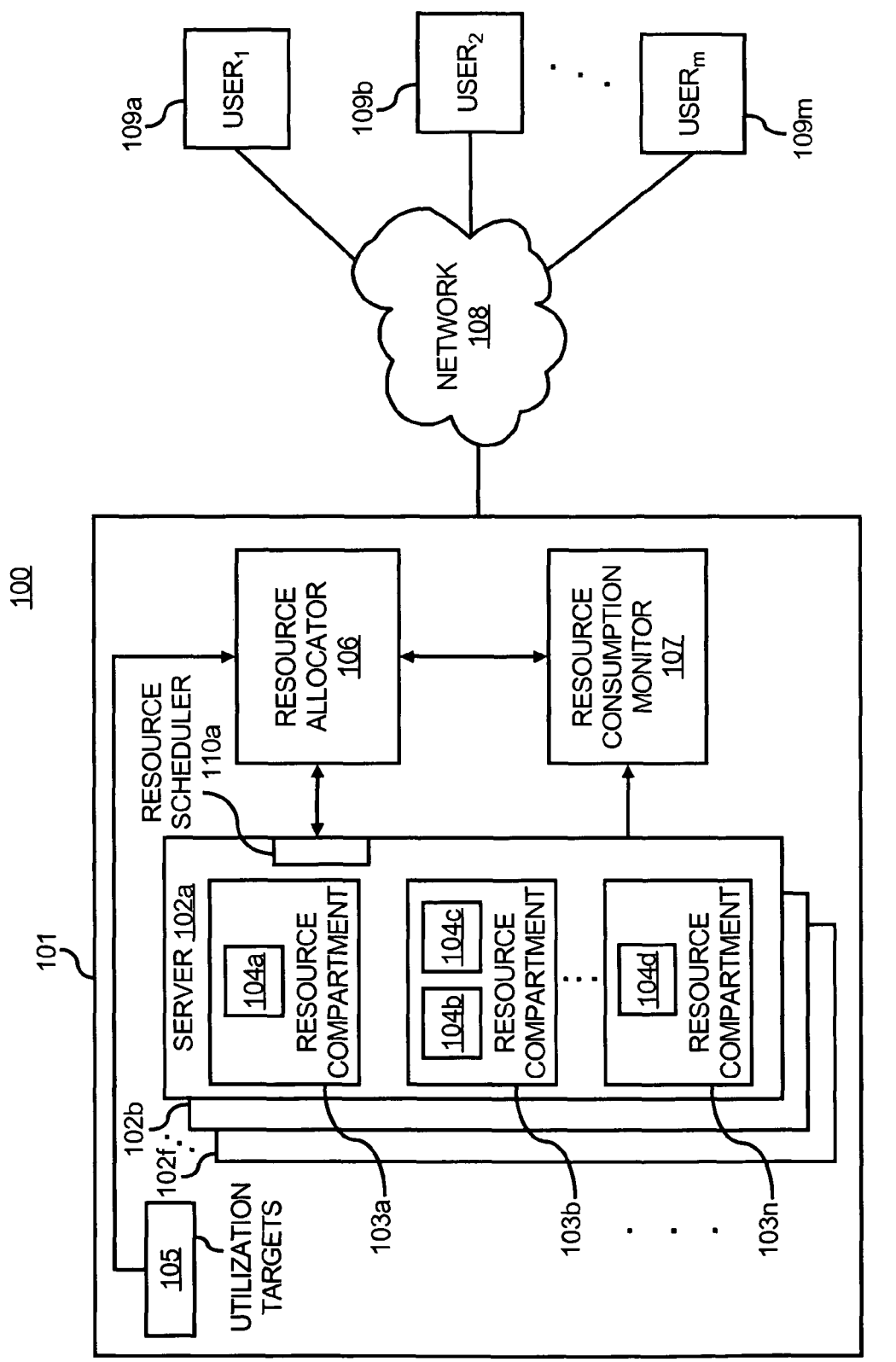
FIG. 1 is a block diagram of a system, according to an embodiment.

With reference first to FIG. 1, there is shown a system 100, according to an embodiment. The system 100 is operable to provide resources on demand. It will be apparent to one of ordinary skill in the art that one or more of the embodiments described herein may be practiced in different types of resource-on-demand environments, such as a data center where servers or portions of servers are allocated, a grid environment, and other types of resource-on-demand environments. A resource-on-demand environment or system includes a system where resources are dynamically allocated. For example, resource allocation may change due to a time-varying workload or other predetermined conditions.

As shown, the system 100 includes a data center 101 connected to a network 108. One or more client devices 109a . . . m, such as a Personal Computer (PC), Personal Digital Assistant (PDA), wireless terminal, cellular telephone, or another type of well known client device is connected to the data center 101 via the network 108. The client device may also include servers which may be in different data centers. The network 108 may be a private network such as an intranet, and/or a public network such as, for example, the Internet.

The data center 101 includes servers 102a . . . f that may be allocated to applications, a resource allocator 106, a resource consumption monitor 107, and utilization targets 105. According to an embodiment, the resources for the data center 101 may be partitioned and assigned to applications. Resources may include CPUs, storage space, network bandwidth, disk I/O bandwidth, etc. Resource partitioning is a type of virtualization technology that enables multiple applications to share system resources while maintaining performance isolation and differentiation among them. For example, CPUs or portions of a CPU, such as in terms of CPU cycles, may be allocated to different applications or different groups of applications. Partition sizes may be set to accommodate the parameters specified in the utilization targets 105 and varying demands, as described in further detail below.

In one embodiment, the resources of the data center 101 are partitioned into resource compartments. The resource compartments 103a . . . n are shown as an example of partitioning the resources of the server 102a. Each resource compartment 103a . . . n includes resources allocated for one or more applications.

In one embodiment, a resource compartment is represented as a process group including one or more applications. The resource compartment 103a, for example, is a process group including application 104a. A process group may include multiple applications such as shown for the resource compartment 103b. In this embodiment, the resources of the server 102a are partitioned for each process group. For example, the CPUs in the server 102a are divided among the resource compartments 103a . . . n. Other resources may be partitioned and assigned to each process group, such as memory, disk space, network bandwidth, etc. A limit on system resources may be assigned to each group which may specify the maximum entitlement of a particular resource to a particular group.

Different types of process groups may be used. For example, a PSET group may be used. For example, a PSET group gets allocated an integer number of CPUs. Another type of process group is a fair share scheduler (FSS) group, where a percentage of CPU cycles are allocated to a group by specifying a number of shares for the group.

In another embodiment, the servers 102a . . . f are partitioned into virtual machines. For example, each resource compartment includes a virtual machine wherein a set of resources are allocated to each virtual machine. Virtual machines provide a technology to implement resource virtualization that allows multiple heterogeneous operating system instances to share a single physical workstation or server. Like a process group, each virtual machine receives an allocation of resources, such as a percentage of CPU capacity, storage capacity, network bandwidth, etc.

In yet another embodiment, a resource compartment may include a server group. For example, the servers 102a . . . f may include a plurality of server groups that are allocated to one or more applications.

Each of the servers 102a . . . f may include a resource scheduler that allocates resources among the resource compartments based on instructions from the resource allocator 106. In one embodiment, a resource scheduler is the fair share scheduler (FSS) in Hewlett-Packard's HP-UX Process Resource Manager (PRM). The PRM is a resource management tool that controls how resources are partitioned and allocated to the resource compartments.

A resource scheduler 110a is shown for the server 102a. Although not shown, one or more resource schedulers may be provided for each server or a single resource scheduler may be used for multiple servers.

The utilization targets 105 include one or more utilization parameters that specify a level of resource utilization to be met by a particular compartment. The utilization targets 105 may be provided by a data center operator based on past experience or by another controller that determines the desired resource utilization based on other metrics, such as service level objectives (SLOs).

The resource allocator 106 determines the allocation of resources for a resource compartment. For example, the resource allocator 106 identifies desired utilization parameters from the utilization targets 105 and allocates the resources of the server 102a to each resource compartment 103a . . . n based on one or more resource consumption metrics measured by the resource consumption monitor 107, and one or more utilization parameters to be met for each application. FIG. 1 shows one resource allocator and one resource consumption monitor by way of example. It will be apparent to one of ordinary skill in the art that more than one resource allocator and resource consumption monitor may be used.

The resource consumption monitor 107 provides monitoring information to the resource allocator 106 on consumption of the resources of the server 102a allocated to the resource compartment 103a . . . n. For example, the resource consumption monitor 107 measures resource consumption metrics for each resource compartment 103a . . . n and provides the metrics to the resource allocator 106. Examples of the resource consumption metrics include CPU consumption, storage consumption, bandwidth consumption, etc. The resource allocator 106 adjusts the resources allocated for each resource compartment 103a . . . n in response to the measured resource consumption metrics and the corresponding utilization targets 105.

According to an embodiment, the resource allocator 106 may use a predictive control system to control the resource entitlement for a resource compartment for each interval to achieve a target utilization. Resource entitlement is the amount of a resource to be allocated to a resource compartment. For example, 0.5 CPUs are entitled and then allocated to the resource compartment 103a. In this example, 0.5 CPUs is the resource entitlement for the resource compartment 103a for the CPU resource. Resource entitlement may also be determined for other resources.

Resource consumption is the amount of the resource that is used by the resource compartment for a given interval. In the above example, if the resource compartment 103a is allocated 0.5 CPUs, which is the resource entitlement in this example, and only 0.3 CPUs are actually used, then 0.3 CPUs is the resource consumption for the resource compartment 103a for the CPU resource. Resource utilization is the ratio of the resource consumption to the resource entitlement for a resource in a resource compartment for an interval. In the above example, the resource utilization for the resource compartment 103a for the CPU resource is 0.3/0.5=0.6. A target utilization is determined, and the predictive control system predicts resource consumption for a time interval and calculates resource entitlement for the time interval to achieve the target utilization.

Figure 2:
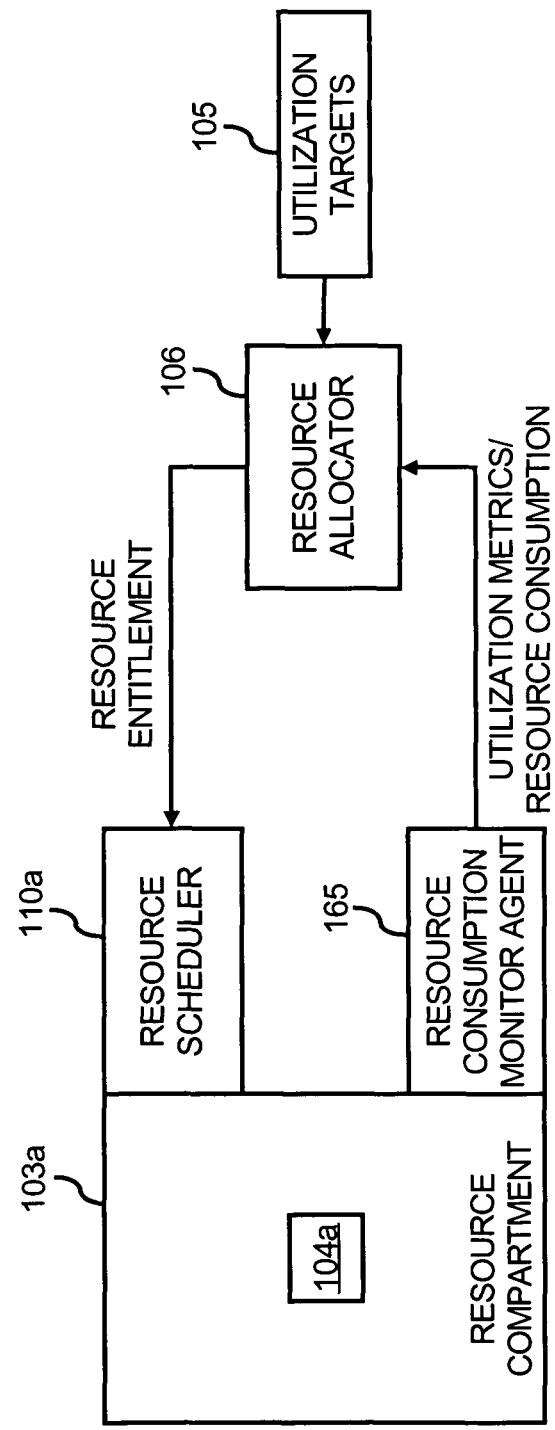
FIG. 2 is a detailed functional block diagram of the system, according to an embodiment.

With respect to FIG. 2, there is shown a more detailed block diagram of a system including the resource allocator 106 controlling resource entitlement for a resource compartment, such as the resource compartment 103a including application 104a. Although not shown, it will be apparent to one of ordinary skill in the art that the resource allocator 106 may control the resource entitlement for a plurality of resource compartments and other types of partitions, such as virtual machines.

The resource scheduler 110a and a resource consumption monitor agent 165 may be respectively used to allocate resources for the resource compartment 103a and to determine the resource consumption monitoring information for the resource compartment 103a. The resource consumption monitor agent 165, for example, is part of the resource consumption monitor 107 shown in FIG. 1 that may include sensors not shown for measuring the resource consumption metrics. For example, the resource consumption monitor agent 165 sends the resource consumption monitoring information, including the measured resource consumption metrics, to the resource allocator 106. The measured metrics may be used as feedback on resource demand in the resource compartment 103a. In another example, the resource consumption monitor agent 165 determines a statistical metric from one or more measured resource consumption metrics, such as an average or a moving average for one or more measured attributes. The statistical metric is also a resource consumption metric. For example, CPU consumption is determined for a time interval. Multiple measurements are performed during the time interval, and a single value, such as average, moving average, etc., is generated as a representation of CPU consumption for the time interval.

The resource allocator 106 determines the resource entitlement of resources for the resource compartment 103a using the resource consumption monitoring information. The resource allocator 106 interacts with the resource compartment 103a through the resource scheduler 110a and the resource consumption monitor agent 165. The resource consumption monitor agent 165 periodically sends the resource consumption metrics for the application 104a, and the resource scheduler 110a sets the resource entitlement according to the output of the resource allocator 106. For example, at the beginning of each sampling interval, the resource allocator 106 receives the measured resource consumption metrics for the last sampling interval, and predicts the resource consumption for the current sampling interval. The resource allocator 106, computes the needed entitlement for the current sampling interval based on the desired utilization from utilization targets 105 using control algorithms described in detail below and passes the entitlement to the resource scheduler for actuation.

Figure 3:
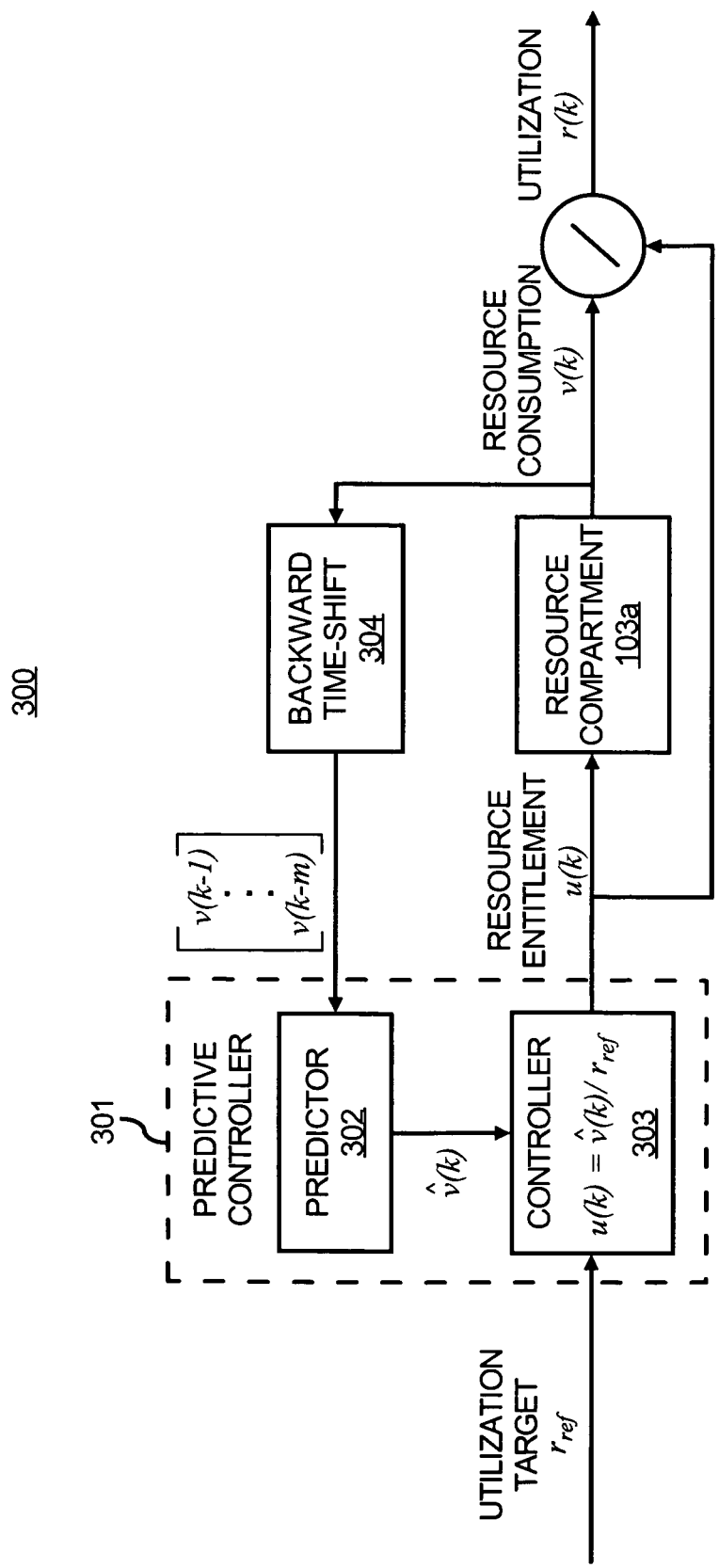
FIG. 3 is a block diagram of a predictive control system, according to an embodiment.

FIG. 3 illustrates a predictive control system 300 for controlling resource entitlement for a resource compartment, according to an embodiment. The control system 300 may be provided in the resource allocator 106 shown in FIGS. 1 and 2.

In FIG. 3, u denotes resource entitlement, v denotes resource consumption, r denotes resource utilization where r=v/u, and $r_{ref}$ is the target resource utilization. The control system 300 includes a predictive controller 301. A function of the predictive controller 301 is to dynamically maintain the resource utilization r at the target resource utilization $r_{ref}$. For example, sensors measure the resource consumption over consecutive time intervals and the resource consumption monitor agent 165 shown in FIG. 2 sends the measurements to the predictive controller 301. The length of the intervals may be predetermined. These intervals are also referred to as sampling intervals.

The predictive controller 301 adjusts the resource entitlement of the resource compartment 103a based on a predicted resource consumption and to maintain the resource utilization r at the target resource utilization $r_{ref}$. However, the resource consumption v of the resource may change for each interval, because the demand of the resource compartment 103a may vary over each interval. Thus, the resource entitlement u may be adjusted at each interval to achieve the target resource utilization $r_{ref}$.

According to an embodiment, the predictive controller 301 includes a predictor 302 and a controller 303. The predictor 302 is operable to predict a resource consumption $\hat{v}(k)$ for a time interval (k) based on a finite number of resource consumptions for previous time intervals v(k−1) through v(k−m). A backward-time-shift 304 represents the finite number of resource consumptions for previous time intervals used to predict the resource consumption $\hat{v}(k)$. The predictor 302 may use a prediction function to calculate the predicted resource consumption $\hat{v}(k)$. Examples of prediction functions that may be used by the predictor 302 are described in detail below.

The controller 303 is operable to compute the resource entitlement u(k) based on the predicted resource consumption $\hat{v}(k)$.

$$u(k)=\hat{v}(k)/r_{ref} \qquad \text{Equation (1)}$$

The controller 303 may compute the resource entitlement u(k) based on equation (1). The controller 303 determines the resource entitlement u(k) such that the resource utilization r(k) is equal to the target resource utilization $r_{ref}$ assuming the resource consumption v(k) is equal to the predicted resource consumption $\hat{v}(k)$. In many instances, the resource consumption v(k) may not be equal to the predicted resource consumption $\hat{v}(k)$. However, the better the prediction of the resource consumption, the greater the ability of the resource-on-demand system to achieve the target resource utilization $r_{ref}$.

As described above, the predictor 302 may use a prediction function to determine the predicted resource consumption $\hat{v}(k)$. Examples of prediction functions that may be used include but are not limited to auto-regression (AR), analysis of variance (ANOVA) decomposition, and multi-pulse (MP) prediction. It will be apparent to one of ordinary skill in the art that other predictive functions may be used.

Regarding AR prediction, an AR model may be used for predicting the resource consumption, $\hat{v}(k)$. For AR model prediction, let {x(k)} be the time series of an attribute x that is of interest to a particular problem, where x(k) represents the measured value of x during time interval k. At the beginning of every interval k, a standard auto-regressive model predicts an attribute's value for the current interval using a linear combination of its value in the past several intervals based on the following:

$$\hat{x}(k) = \sum_{i=1}^{m} a_i x(k-i), \qquad \text{Equation (2)}$$

where $\hat{x}(k)$ is the predicted value for x(k), {$a_i$} are the predictor coefficients and m is the order of the model that indicates the number of past samples used for the prediction. This model is useful when the system producing the attribute x has some amount of memory, and therefore the attribute's value is strongly correlated to its recent past. Using this model, $\hat{v}(k)$ is equal to $\hat{x}(k)$, and $\hat{v}(k)$ may be computed using equation (2).

The predictor coefficients can be either computed offline using the least-squares method on training data, or estimated online using a recursive least-squares (RLS) algorithm. The latter approach allows the AR model to be updated periodically, adapting to possible changes in demand or changes to resources.

ANOVA decomposition is another predictive function that may be used for predicting the resource consumption, $\hat{v}(k)$. For ANOVA decomposition, assume the measured attribute x is affected by certain independent factors, such as time-of-day, and then x can be modeled with two processes based on ANOVA decomposition.

$$x(k)=c(k)+\text{reffects}(k), \qquad \text{Equation (3)}$$

where c(k) captures the periodic long-term patterns (constant effects) and reffects(k) represents the short-term random effects. For a pattern caused by two factors, for instance, the constant effects can be modeled as, $$c(k)=\mu+\alpha_i+\beta_j+(\alpha\beta)_{ij}, \qquad \text{Equation (4)}$$

where i and j depend on the location k in the period, μ is the overall mean of the series, $\alpha_i$ and $\beta_j$ are from the two individual factors and the last term represents the interactive effect between the two factors.

If time-dependences still exist after factoring out the known effects, the residual process can be further decomposed as:

$$\text{reffects}(k)=z(k)+\epsilon(k), \qquad \text{Equation (5)}$$

where z(k) represents the non-stationary part and $\epsilon(k)$ is a stationary process with zero mean. Sometimes z(k) can be described with an AR model as follows:

$$z(k) = \sum_{i=1}^{m} b_i z(k-i). \qquad \text{Equation (6)}$$

With the patterns identified from history data, the mean at time k of the attribute x can then be predicted based on its past values as $$\hat{x}(k)=\mu+\alpha_i+\beta_j+(\alpha\beta)_{ij}+z(k). \qquad \text{Equation (7)}$$

Using ANOVA decomposition, $\hat{v}(k)$ is equal to $\hat{x}(k)$, and $\hat{v}(k)$ may be computed using equation (7).

MP prediction is another predictive function that may be used for predicting the resource consumption, $\hat{v}(k)$. MP prediction uses a prediction model that attempts to track both long-term patterns and short-term correlations in a time series. MP prediction maintains the online learning capability of the AR model and eliminates the need for offline analysis as in the ANOVA approach. The model may be represented as follows:

$$\hat{x}(k) = \sum_{i=1}^{m} a_i x(k - n_i)$$ Equation (8)

The difference between the AR model represented by equation (2) and the MP model represented by equation (8) is that rather than using the samples immediately preceding the attribute value to be predicted, the MP model can use sample values from much earlier in the history for prediction. Unlike the AR model, both the predictor coefficients $\{a_i\}$ and the predictor delays $\{n_i\}$ are computed dynamically in this model. The predictor delays are computed by minimizing the mean-squared error between the predicted value and the samples, while searching for the predictor delays over some history.

Figure 4:
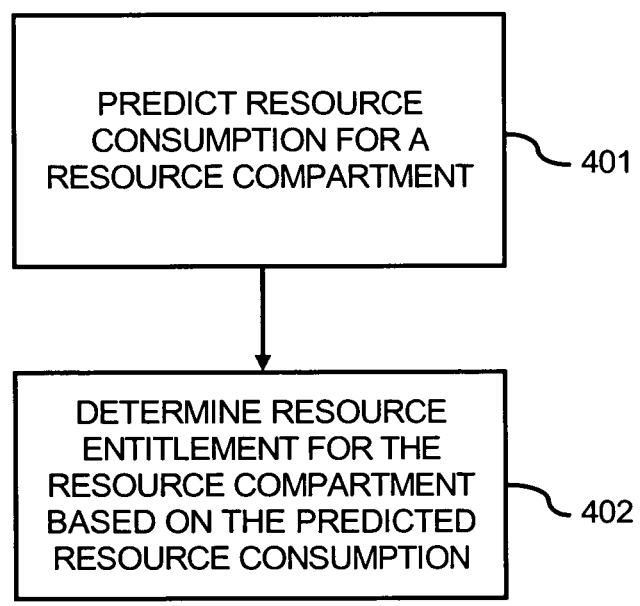
FIG. 4 is a flowchart of a method for controlling resource entitlement, according to an embodiment.

With reference to FIG. 4, there is shown a method 400 for determining resource entitlement for a resource in a resource-on-demand system using a predictive control loop, according to an embodiment. The method 400 is described with respect to FIGS. 1-3 by way of example and not limitation.

At step 401, the predictive controller 301 shown in FIG. 3 predicts a resource consumption of a resource compartment for a future time interval. For example, the predictor 302 uses a predictive function to calculate the predicted resource consumption, $\hat{v}(k)$ for a resource compartment, such as the compartment 103a. The predicted resource consumption for a resource compartment may be the predicted resource consumption of the application(s) in the resource compartment if the resource compartment is process group, or the predicted resource consumption of the VM if the resource compartment is a VM. The predicted resource consumption may be determined from previous measured resource consumptions. The future time interval may be a current time interval k, for which resource entitlement needs to be determined or other future time intervals.

At step 402, the predictive controller 301 determines a resource entitlement for the resource compartment for the future time interval based on the predicted resource consumption. For example, the controller 303 determines the resource entitlement using equation (1) described above such that the resource utilization r(k) is equal to the target resource utilization $r_{ref}$ assuming the resource consumption v(k) is equal to the predicted resource consumption $\hat{v}(k)$.

Figure 5:
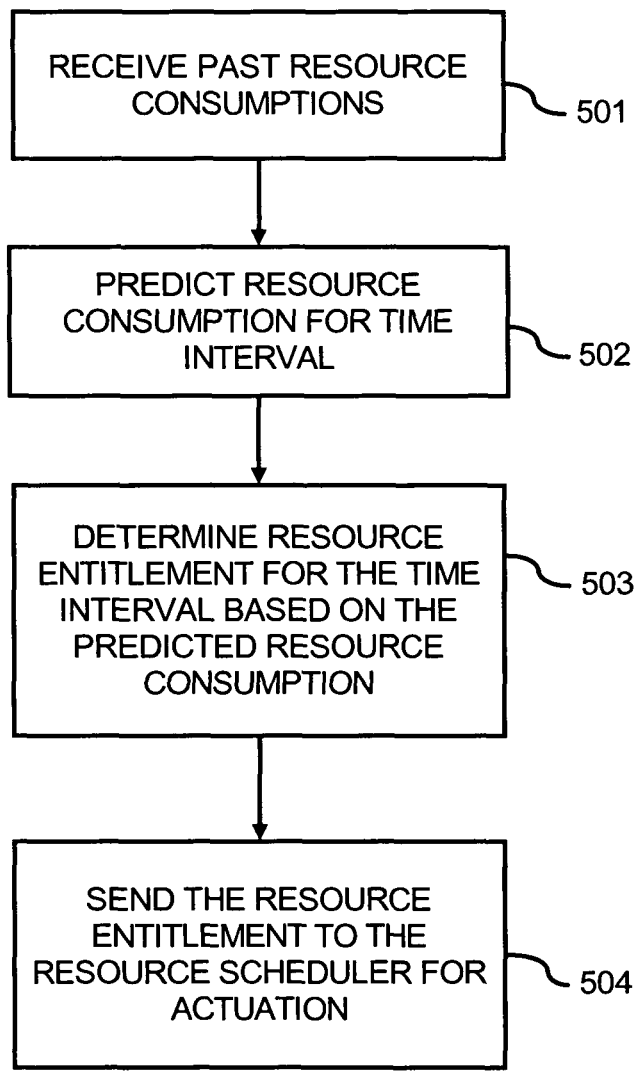
FIG. 5 is a flowchart of a more detailed method for controlling resource entitlement, according to an embodiment.

FIG. 5 illustrates a method 500 performed by the predictive controller 301 shown in FIG. 3. FIG. 5 includes the steps of the method 400 and also includes additional details for the method 500.

At step 501, the predictive controller 301 receives past measured resource consumptions. The past resource consumptions v(k−1) through v(k−m) may be measured, for example, by the resource consumption monitor 107 shown in FIG. 1 and sent by the resource consumption monitor agent 165 shown in FIG. 2 to the resource allocator 106, which may include the predictive controller 301 shown in FIG. 3.

At step 502, the predictive controller 301 predicts a resource consumption of a resource compartment for a future time interval. For example, the predictor 302 uses a predictive function to calculate the predicted resource consumption, $\hat{v}(k)$ for a resource compartment, such as the compartment 103a, as described with respect to step 401. The future time interval may be a current time interval k, for which resource entitlement needs to be determined or other future time intervals.

At step 503, the predictive controller 301 determines a resource entitlement for the resource compartment for the future time interval based on the predicted resource consumption. For example, the controller 303 determines the resource entitlement using equation (1), such as described above with respect to step 402.

At step 504, the predictive controller 301 sends the resource entitlement to the resource scheduler 110a shown in FIG. 2. The resource scheduler 110a allocates the resource entitlement for the resource compartment for the interval k. Then, the resource consumption is measured after the resource allocation for the interval k and stored. The resource consumption is the measured resource consumption v(k).

The methods 400 and 500 may be repeated for each current interval. For example, at the beginning of each interval the resource consumption is predicted and the resource entitlement is determined. Then, for that interval, the resource entitlement is allocated and the resource consumption is measured and stored.

Figure 6:
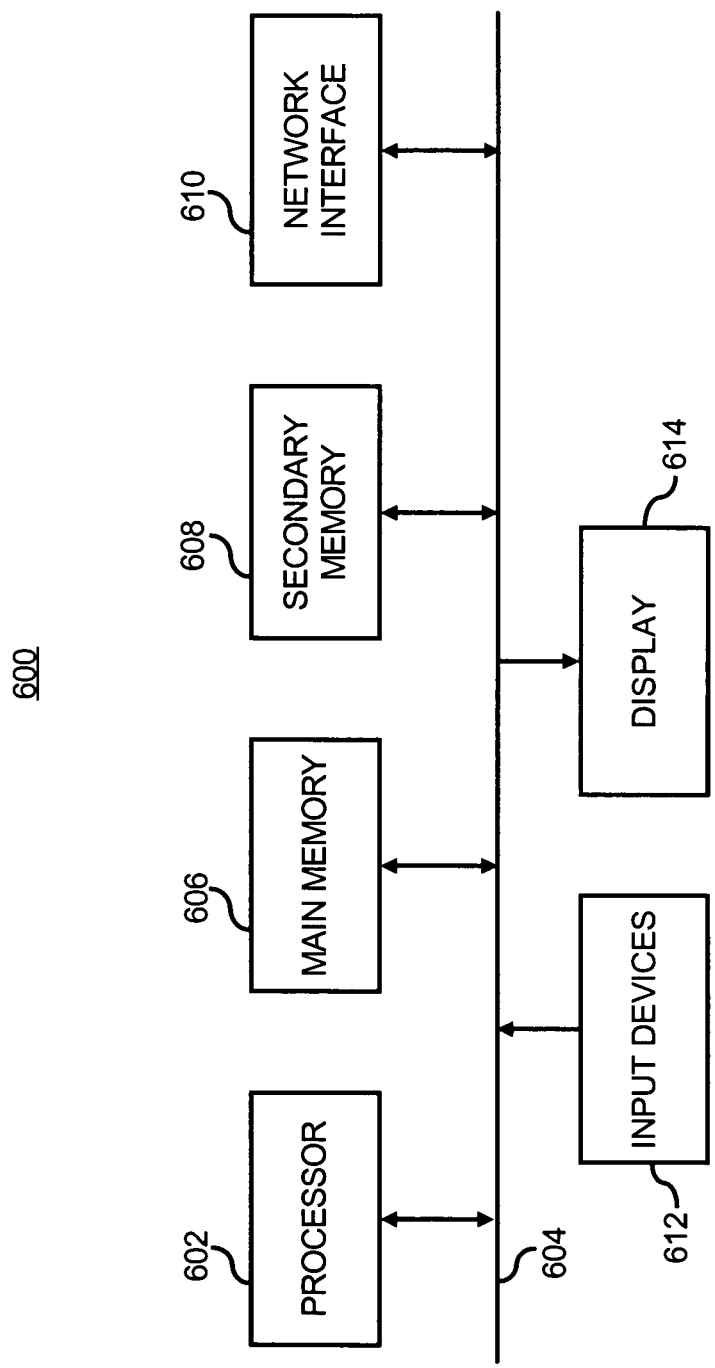
FIG. 6 is a block diagram of a computer system, according to an embodiment.

FIG. 6 illustrates an example of a hardware platform for the resource allocator 106 and other components shown in FIGS. 1-3. For example, the hardware platform includes a computer system 600. The computer system 600 includes one or more processors, such as processor 602, providing an execution platform for executing software. Commands and data from the processor 602 are communicated over a communication bus 604. The computer system 600 also includes a main memory 606, such as a Random Access Memory (RAM), where software may be resident during runtime, and a secondary memory 608. The secondary memory 608 includes, for example, a hard disk drive or other type of storage device. Other examples of the secondary memory 608 include ROM (read only memory), EPROM (erasable, programmable ROM), EEPROM (electrically erasable, programmable ROM).

The computer system 600 optionally includes user interfaces comprising one or more input devices 612, such as a keyboard, a mouse, a stylus, and the like. The computer system 600 also optionally includes a display 614. A network interface 610 is provided for communicating with other computer systems. It will be apparent to one of ordinary skill in the art that the computer system 600 may include more or less features depending on the complexity of the system needed.

According to an embodiment, one or more of the steps of the methods 400 and 500 and other steps described herein are implemented as software embedded on a computer readable medium, such as the memory 606 and/or 608, and executed on the computer system 600, for example, by the processor 602.

In an example, the predictive control system 300 may be implemented using a set of programmed instructions that when executed by a processor causes the processor 602 to perform as described herein, including the steps described with respect to FIGS. 4 and 5. The instructions may be a set of executable instructions derived from one or more source code modules implemented using any number of known programming languages. Alternatively, the instructions may be implemented using hardware or firmware, or a combination thereof or in further combination with the executable software instructions described above. The instructions may be embodied upon a computer-readable medium and downloaded to the system 100 or retrieved by the system 100 into one or more local memories for execution.

One or more of the steps of the methods 400 and 500 and other steps described herein are embodied in a computer program, which may exist in a variety of forms both active and inactive. For example, the steps exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

What is claimed is:

1. A method for controlling resource entitlement in a resource-on-demand system, the method comprising:
    predicting, by a resource allocator in a computer system, a resource consumption of a resource compartment for a time interval;
    determining, by the resource allocator, a resource entitlement for the resource compartment for the time interval such that the resource entitlement is equal to the predicted resource consumption divided by a target resource utilization; and
    sending the resource entitlement to a resource scheduler to allocate the resource entitlement to the resource compartment.

2. The method of claim 1, wherein predicting a resource consumption of a resource compartment for a time interval further comprises:
    determining resource consumptions for previous time intervals for the resource compartment; and
    predicting the resource consumption for the resource compartment for the time interval based on the resource consumptions for the previous time intervals.

3. The method of claim 2, wherein predicting the resource consumption for the resource compartment for the time interval based on the resource consumptions for the previous time intervals further comprises:
    predicting the resource consumption for the resource compartment for the future time interval using one of an auto-regressive model, ANOVA decomposition, and a multi-pulse model.

4. The method of claim 1, further comprising:
    measuring a resource consumption for the resource compartment for the time interval; and
    storing the resource consumption for the time interval.

5. The method of claim 1, further comprising:
    using the stored resource consumption and other stored resource consumptions for the resource compartment to predict a resource consumption and determine a resource entitlement for a future time interval.

6. A predictive control system for controlling resource entitlement for a resource compartment comprising:
    a resource scheduler operable to schedule a resource entitlement for the resource compartment;
    a sensor operable to determine resource consumption of the resource compartment; and
    a predictive controller operable to predict a resource consumption of a resource compartment for a time interval and determine a resource entitlement for the resource compartment for the time interval such that the resource entitlement is equal to the predicted resource consumption divided by a target resource utilization, and the predictive controller is further operable to send the resource entitlement to the resource scheduler to allocate the resource entitlement to the resource compartment.

7. The system of claim 6, wherein the resource entitlement is an allocation of a resource comprising one of CPU cycles, network bandwidth, and storage space.

8. The system of claim 6, wherein the predictive controller comprises a predictor operable to predict the resource consumption of the resource compartment for the time interval based on measured consumptions for previous time intervals.

9. The system of claim 6, wherein the resource compartment comprises one of a process group and a virtual machine.

10. The system of claim 6, wherein the sensor measures the resource consumption for the resource compartment for the time interval after the resource entitlement is allocated to the resource compartment, and the measured resource consumption is stored for predicting resource consumption for future time intervals.

11. A computer readable storage device upon which is embedded programmed instructions which when executed by a processor will cause the processor to perform a method for controlling resource entitlement in a resource-on-demand system, the method comprising:
    predicting a resource consumption of a resource compartment for a time interval;
    determining a resource entitlement for the resource compartment for the time interval such that the resource entitlement is equal to the predicted resource consumption divided by a target resource utilization; and
    sending the resource entitlement to a resource scheduler to allocate the resource entitlement to the resource compartment.

12. The computer readable storage device of claim 11, wherein predicting a resource consumption of a resource compartment for a time interval further comprises:
    determining resource consumptions for previous time intervals for the resource compartment; and
    predicting the resource consumption for the resource compartment for the time interval based on the resource consumptions for the previous time intervals.

13. The computer readable storage device of claim 12, wherein predicting the resource consumption for the resource compartment for the time interval based on the resource consumptions for the previous time intervals further comprises:
    predicting the resource consumption for the resource compartment for the future time interval using one of an auto-regressive model, ANOVA decomposition, and a multi-pulse model.

14. The computer readable storage device of claim 11, wherein the method further comprises:
    measuring a resource consumption for the resource compartment for the time interval; and
    storing the resource consumption for the time interval.

15. The computer readable storage device of claim 14, wherein method further comprises:

using the stored resource consumption and other stored resource consumptions for the resource compartment to predict a resource consumption and determine a resource entitlement for a future time interval.

\* \* \* \* \*